United States Patent [19]

Yabe et al.

[11] 3,737,113
[45] June 5, 1973

[54] DEVICE FOR AUTOMATICALLY TAKING UP A MOTION PICTURE FILM

[75] Inventors: Shinichi Yabe; Mitsuru Katsumata, both of Ashigara-Machi, Japan

[73] Assignee: Fuji Photo Film Co., Ltd., Kanagawa, Japan

[22] Filed: Nov. 16, 1971

[21] Appl. No.: 199,161

[30] Foreign Application Priority Data

Nov. 16, 1970 Japan .............................. 45/100913

[52] U.S. Cl. ..................... 242/67.1, 242/74, 242/76, 242/195, 242/210
[51] Int. Cl. .......................... G03b 1/56, B65h 17/02
[58] Field of Search ..................... 242/67.1 R, 74, 76; 352/157, 158; 226/91

[56] References Cited

UNITED STATES PATENTS

| | | | |
|---|---|---|---|
| 3,222,007 | 12/1965 | Schmuck ........................... | 242/76 X |
| 3,395,870 | 8/1968 | Klinger ........................ | 242/67.1 R X |
| 1,645,882 | 10/1927 | Stuber ................................. | 242/76 |

*Primary Examiner*—George F. Mautz
*Assistant Examiner*—Edward J. McCarthy
*Attorney*—Richard C. Sughrue, Gideon Franklin Rothwell and Donald E. Zinn et al.

[57] ABSTRACT

A device for automatically taking up a strip of film or other material has a film feeding outlet constructed at the end of a movable guide mounted on the respective shafts of two engaged gears. A third shaft is provided for mounting a reel having a slit on a core for winding the film opposite to the outlet. An inner cam mechanism is positioned for holding the third shaft in such a manner that the outlet is disposed opposite the slit. An outer cam mechanism is provided for rotating the reel after the end of the film passes through the outlet to enter the slit and in addition holds the outlet in a half open state. The outer cam mechanism further fully opens the movable guide when the reel rotates so that the end of the film is fixed to the core, thereby permitting the film to be automatically taken up.

6 Claims, 6 Drawing Figures

PATENTED JUN 5 1973
3,737,113
SHEET 1 OF 2
FIG.1
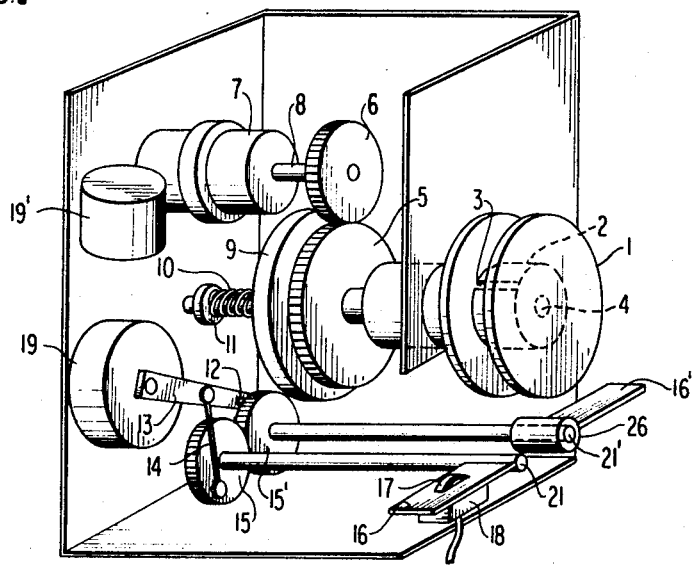
FIG.5
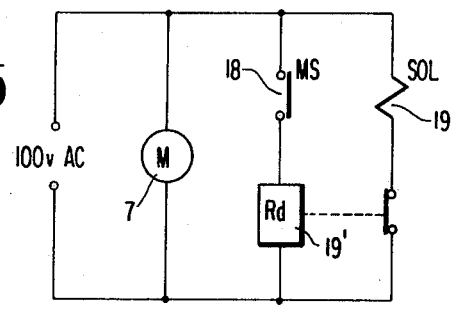
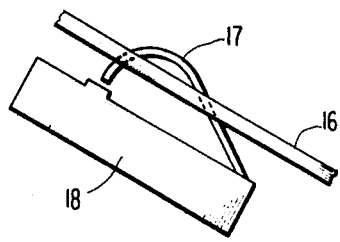
FIG.6

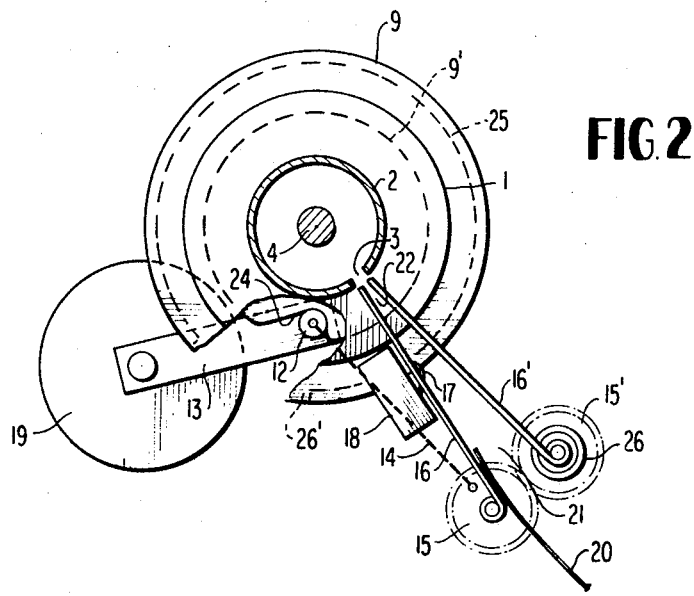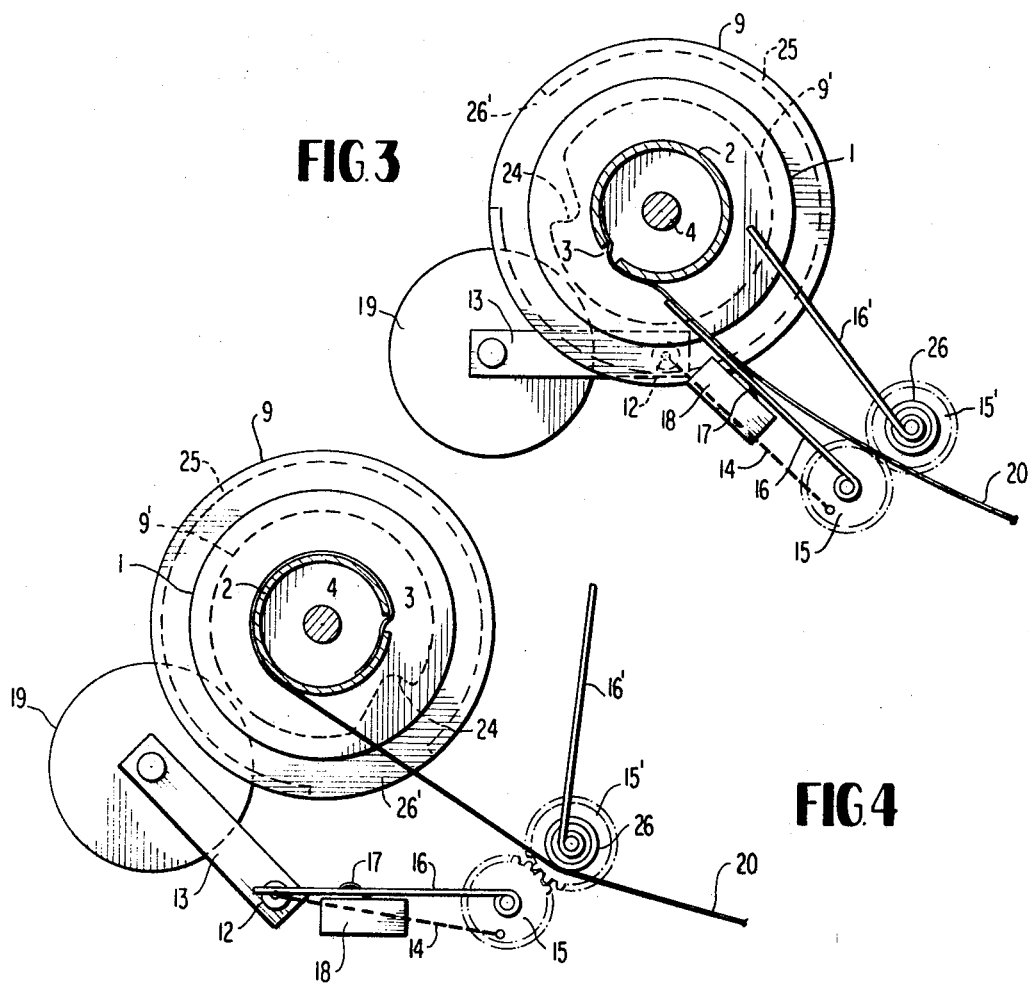

{ 3,737,113 }

DEVICE FOR AUTOMATICALLY TAKING UP A MOTION PICTURE FILM

BACKGROUND OF THE INVENTION

1. Field of the Invention

This invention relates to a device for automatically taking up film by automatically inserting the end of the film into the reel spool.

2. Description of the Prior Art

Heretofore, in the development of a strip of film, such as 35 mm, the treated film coming from the developing device was taken up manually onto a spool or reel. With the recent advent of a speeding up of the development time, it has been found that the speed of the treated film leaving the developing bath or device requires a rapid handling to such a degree that it has become difficult to manually take up the treated film in a conventional manner. Thus, the prior art has experienced a need to provide a device for automatically taking up the treated film as it leaves the developing stage.

SUMMARY OF THE INVENTION

The present invention has been devised to meet the requirements of the prior art, as mentioned above. It is an object of this invention to provide a device for automatically taking up a film by fixing it to a spool and subsequently rolling the film onto the spool or reel.

It is another object of this invention to provide a device for automatically taking up a film which is substantially foolproof and does not require a human operator.

It is still another object of the present invention to provide a device which will never fail in guiding the end of the film even if the end of the film is bent.

Finally, it is still another object of the present invention to provide a device that automatically takes up the film, regardless of whether the film is approaching the device at a high speed or at a low speed.

According to one aspect of this invention, there is provided a mechanism or device for automatically taking up film which comprises a film feeding outlet constructed in the end of a movable guide mounted on the respective shafts of two engaged gears. A third shaft mounts the reel or spool having a slit on a core for winding the film opposite the outlet. An inner camming mechanism holds the third shaft in such a manner that the outlet is disposed opposite the slit in the reel, while an outer camming mechanism rotates the reel after the end of the film passes through the outlet to enter the slit. The outer camming mechanism also holds the outlet in a half open state and can fully open the movable guide when the reel rotates so that the end of the film is fixed to the core.

BRIEF DESCRIPTION OF THE DRAWINGS

Other objects, features and advantages of the present invention will become apparent from the following description, taken in conjunction with the accompanying drawings, in which;

FIG. 1 is a perspective view of one embodiment of the present invention for automatically taking up film, portions of the side walls and upper wall have been removed for illustrative purposes;

FIG. 2 is a side view of the embodiment of the device in its operative position before the film is taken up on the reel;

FIG. 3 is a side view of the embodiment of the invention immediately after the film has begun to be wound onto the reel;

FIG. 4 is a side view of the embodiment of the device after the film is fixed onto the core of the reel;

FIG. 5 is a wiring diagram of the electric circuit of the present invention, and FIG. 6 is an explanatory view of the detecting portion of the film guide.

DESCRIPTION OF THE PREFERRED EMBODIMENT

Referring to the drawings, a take-up reel 1 has a core 2 and a slit 3 for fixing the end of the film. The take-up reel is mounted on a shaft. Also mounted on the shaft is a transmission gear for providing a take-up torque. A spur gear 6 transmits the take-up torque of the film from an electric motor 7 via a shaft 8. The spur gear 6 meshes with the gear 5. An outer cam member 9 is urged by a spring 10 onto the spur gear 5. An inner cam 9' is disposed at the inside of the cam 9. A spring holder 11 is positioned on the shaft to hold the spring 10. A projection pin 12 is fixed at one end of a cam lever 13 to move in response to the movement of a rotary solenoid 19. The projection pin 12 engages with an interval or cut-out portion of the cam 9'. A connecting rod 14 is rotatably mounted at one end to the cam lever 13 and eccentrically fixed at the other end to either of the spur gears 15 and 15' for rotatably driving the shafts 21 and 21'. The shafts 21 and 21' carry the movable guides 16 and 16' at their other end. A sensor or projection 17 for detecting the end of the film is provided on the guide 16, while a microswitch 18 is interlocked to the detector. A time-lag relay 19' for starting the operation based on the signal from the microswitch 18 and for rotating the rotary solenoid 19 after a predetermined time-lag for permitting the end of the film to enter the slit for the purpose of fixing the end of the film opposite the slit is provided.

In operation, the end of the film 20 that has been treated in the developing device and fed out therefrom enters the film inserting inlet 21 between the two rotatable guides 16 and 16'. The film contacts the detector 17 before it enters the end of the movable guides 22 and slit 3 of the reel 2. The signal provided by the microswitch 18 operates through the time-lag relay 19' which has been set for the particular speed of the incoming film to activate the rotary solenoid 19. The rotary solenoid 19 is activated so that the cam lever 13 carrying the projection pin 12 is removed from the concavity or recess 24 of the inner cam 9', see FIG. 2. Both the cam 9 and 9' and spur gear 5 for transmitting the take-up torque which is rotated by the urging force of the spring 10, acts simultaneously when the projection pin 12 is removed from the recess 24, and thereby the reel 1 is rotated through the shaft 4. Since the other end of the cam lever 13 is being rotated, then the meshing spur gears 15 and 15' drive the shafts 21 and 21' through an eccentrical connection by the connecting rod 14 so that the movable guide 16 and 16' are moved into a half opened state as shown in FIG. 3. When the reel 1 is rotated, the projection pin 12 falls out of the outer cam 9 from the cut-out portion 26' of the outer peripheral projection 25 of the outer cam 9. When the lever 13 falls out of the outer cam 9, the spur gears 15 and 15' drive the shafts 21 and 21' through the rotation of the connecting rod 14 so that the movable guides 16 and 16' are fully opened by the shafts, see FIG. 4, and the film 20 is automatically taken up. Since the roller 26 is made of a cylinder of teflon and can be free wheeling to act as an idler roller, its engagement with the film 20 will not damage the film as it is taken up onto the reel 2.

Referring to FIG. 5, a 100 volt alternating current source is applied across the electric motor 7, the microswitch 18 and the solenoid 19. The electric motor 7 can be energized in a stalled or non-rotating state, and then subsequently permitted free rotation by the release of the cam 9' through the removal of the projection pin 12. Alternative embodiments can be envisioned where the motor 7 can be rotatable with the gear 5 moving into a meshing engagement with 6 upon the removal of the projection pin 12.

With the use of the time delay mechanism, the rotary solenoid starts to operate to remove the projection pin 12 at the end of the lever 13 to transmit the take-up torque of the motor 7, through the urging force of the spring 10 after the end of the film is positively inserted into the slit 3 of the core 2 of the reel 1.

By virtue of the arrangement of the movable guides 16 and 16', it can be seen that even if the film is bent or distorted in some form, it will still be directed for entrance into the slit 3 of the reel 1, and thereby will not disturb the automatic process of the present invention.

The above disclosure is directed to the preferred embodiment, however, it can be readily seen that a person skilled in the art can readily modify the present invention within the proper scope and accordingly, the present invention should be measured solely from the following claims.

What is claimed is:

1. A take-up device for automatically taking up film comprising:
   a motor means;
   a reel having a spool portion with a slot connected to the motor means;
   a movable guide means mounted for directing film towards the slot prior to the rotation of the reel by the motor means;
   a detector means for determining the passage of film through the guide means and for producing a corresponding signal, and
   means for removing the guide means and activating the rotation of the reel by the motor means after the film enters the slot in the spool in response to the detector signal whereby the film is taken up by the reel without interference by the guide means.

2. A take-up device as in claim 1, where the guide means includes a pair of oppositely rotatable members that both rotate away from the reel.

3. A take-up device as in claim 1, where the means for removing the guide means and activating the rotation of the reel includes a time-delay relay, a rotating solenoid, a locking cam and lever, whereby the time-delay relay receives the signal from the detector means and activates after a set period of time the rotating solenoid to remove the lever from the locking cam and permit the rotation of the reel by the motor means.

4. A take-up device as in claim 2, where the detector means includes a microswitch mounted on one of the rotatable members.

5. A take-up device as in claim 3, where the guide means includes a pair of oppositely rotatable members and a pair of meshing gears attached to the rotatable members and a link attached to the lever and eccentrically mounted on one of the gears for rotating the rotatable members when the locking cam is released.

6. A take-up device as in claim 5, further including a teflon guide for the film mounted at the end of one of the rotatable members.

* * * * *